US007805131B2

(12) United States Patent
Cholkar et al.

(10) Patent No.: US 7,805,131 B2
(45) Date of Patent: Sep. 28, 2010

(54) PERSONAL SERVICE INTEGRATION ON A NETWORK

(75) Inventors: Arjun Cholkar, Vibhutipura (IN); Vikram Saksena, Acton, MA (US); Fardad Farahmand, Wellesley, MA (US); Sunil Menon, Ramagondahalli Bangalore (IN); Nagesh Kumar Bollapalli Venkata, Bangalore (IN); Nagesh S. Shekar, Jayanagar (IN); Ashish Nagpal, Kundalahalli (IN)

(73) Assignee: Sonus Networks, Inc., Westford, MA (US)

( * ) Notice: Subject to any disclaimer, the term of this patent is extended or adjusted under 35 U.S.C. 154(b) by 602 days.

(21) Appl. No.: 11/744,034

(22) Filed: May 3, 2007

(65) Prior Publication Data

US 2008/0274755 A1 Nov. 6, 2008

(51) Int. Cl.
*H04M 3/42* (2006.01)

(52) U.S. Cl. .............. 455/414.1; 455/412.2; 455/456.1; 455/415; 379/88.01; 379/88.19; 379/201.03

(58) Field of Classification Search ................. 455/466, 455/414.1, 414.2, 403, 456.1–456.6, 457, 455/458, 404.2, 407, 412.2, 518–519, 415, 455/417, 421; 379/88.01, 88.19, 201.01–201.03
See application file for complete search history.

(56) References Cited

U.S. PATENT DOCUMENTS

| | | | | |
|---|---|---|---|---|
| 7,130,890 | B1 * | 10/2006 | Kumar et al. | 709/218 |
| 2002/0087797 | A1 * | 7/2002 | Adrangi | 711/133 |
| 2004/0127235 | A1 * | 7/2004 | Kotzin | 455/466 |
| 2005/0100142 | A1 * | 5/2005 | Gandhi et al. | 379/88.01 |
| 2006/0104431 | A1 | 5/2006 | Emery et al. | 379/211.04 |
| 2007/0077920 | A1 * | 4/2007 | Weeks et al. | 455/414.1 |
| 2007/0150286 | A1 * | 6/2007 | Miller et al. | 704/270.1 |
| 2008/0275941 | A1 | 11/2008 | Shekar et al. | 709/203 |

FOREIGN PATENT DOCUMENTS

| | | |
|---|---|---|
| WO | WO 97/47095 | 12/1997 |
| WO | WO 2006/104345 | 10/2006 |
| WO | WO 2006/110011 | 10/2006 |

OTHER PUBLICATIONS

J.R. Ensor et al., "Blending IPTV Services", International World Wide Web Conference, May 23, 2006, 6 pages.

A. Beck et al., "Blending Telephony and IPTV: Building the TV-Link Service Package using the Alcatel-Lucent Service Broker", Bell Labs Technical Journal, vol. 12, No. 1, Mar. 21, 2007, pp. 23-39.

T. Dinsing et al., "Service Composition in IMS using Java EE SIP Servlet Containers", Ericsson Review No. 3, Jan. 1, 2007, pp. 92-96.

(Continued)

*Primary Examiner*—Wayne Cai
(74) *Attorney, Agent, or Firm*—Proskauer Rose LLP

(57) ABSTRACT

Described are computer-based methods and apparatuses, including computer program products, for personal service integration on a network. A personal service monitors and stores user requests for services. The stored user requests are processed to determine usage patterns. The personal service processes the usage patterns to determine future requests and/or to determine how to fulfill a request. The personal service processes the request.

25 Claims, 11 Drawing Sheets

OTHER PUBLICATIONS

Annex to Invitation to Pay Additional Fees dated Nov. 12, 2008, received in International Application No. PCT/US2008/062246.
U.S. Appl. No. 11/743,966, filed the same day as, related to, and assigned to the same entity as U.S. Appl. No. 11/744,034.
R. Rosmarin, "Express Yourself—For a Fee," Forbes.com, Mar. 28, 2006, 2 pages.
Avatar (icon), http://en.wikipedia.org/wiki/Avatar_(virtual_reality), Oct. 5, 2006, 4 pages.
Verbot® Standard Edition & Verbots® Online *Introducing the Perfect Couple*, http://www.verbots.com, 2004, 2 pages.
T. Hills, "IMS Guide," Light Reading, http://www.lightreading.com/document.asp?doc_id+70728&print=true, Mar. 24, 2005, 10 pages.
SIP Requests, http://en.wikipedia.org/wiki/SIP_Requests, Jul. 31, 2006, 1 page.
SIP Responses, http://en.wikipedia.org/wiki/SIP_Responses, Sep. 25, 2006, 2 pages.
Session Initiation Protocol, http://en.wiKipedia.org/wiki/Session_Initiation_Protocol, Oct. 7, 2006, 5 pages.
IP Multimedia Subsystem, http://en.wikipedia.org/wiki/IP_Multimedia_Subsystem, Sep. 27, 2006, 13 pages.
P. May, "Application Services in an IP Multimedia Subsystem (IMS) Network", Data Connection Limited, undated, 27 pages.
"Lucent Technologies Expands Industry-Leading IMS Portfolio with New IP Services for Next-Gen Mobile and Wireline Networks," Supercomm 2005, Booth 64056, http://www.lucent.com/press/0605/050607.cof.html, Jun. 7, 2005, 4 pages.
White Paper, IMS—IP Multimedia Subsystem, The Value of Using the IMS Architecture, Ericsson, Oct. 2004, 27 pages.
J. Waclawsky "IMS 101: What You Need to Know Now," Business Communications Review Magazine, Jun. 15, 2005, 9 pages.
O. Jamaigne and P. Lopes, "How Can Communications Service Providers Overcome New Competitive Threats?—Think Applications!" Lucent Technologies, Bell Labs Innovation, 2006, 12 pages.
IP Multimedia Subsystem (IMS) Service Architecture, Lucent Technologies, Bell Labs Innovations, 2005, 12 pages.
E. Gubbins, "Globalcomm: Lucent unveils Acuity," TELEPHONYonline, http://telephonyonline.com/software/technology/lucent_acuity_qos_060806/, Jun. 8, 2006, 3 pages.
P. Krishnaswamy et al., "Getting to the IP Multimedia Subsystem: Migrating the Home Location Register to the Home Subscriber Server," CompactPCI and AdvancedTCA Systems, Jun. 2006, 4 pages.
Forward IMs to your Mobile Phone, http://mobile1.aol.com/mobileaim/forwardims, 2006, 4 pages.
Ericsson IMS Messaging, Messaging: a richer communication experience, http://www.ericsson.com/products/hp/Ericsson_IMS_Messaging_pa.shtml, undated, 1 page.
S. Lawson, "What IMS promises enterprises and carriers," ITworld.com, http://www.itworld.com/Net/2613/050920ims/, Sep. 20, 2005, 3 pages.
IMS Messaging, 3GPP Feature, http://www.3gpp.org/specs/WorkItem-info/WI—31022.htm; Feb. 6, 2003, 1 page.
The Ultimate After-Hours Solution for Brick & Mortar Businesses, MMI, http://www.megamania.com/business-leads-products/live-customer-support.htm, undated, 3 pages.
"IPTV Metro Multicasting—Introduction," Light Reading, http://www.lightreading.com/document.asp?doc_id=100842&print=true, Sep. 28, 2006, 10 pages.
R. Jana, et al. "From IPTV to Mobile TV to IMS-TV?: Implications and standards for a network operator," IPTV *workshop* International World Wide Web Conference, May 23, 2006, 5 pages.
M. Bernstein, M. Doerk, "IPTV Meets IMS," Nortel, undated, 4 pages.
C. Wilson, "SBC Chooses Lucent IMS," TELEPHONYonline, Oct. 18, 2005, 2 pages.
"Readme_ServiceBrokerInterface," http://msdn2.microsoft.com/en-us/library/ms160855 (d=printer).aspx, Dec. 5, 2005, 1 pages.

* cited by examiner

Personal Service Information 300a

```
<Person> Joe Smith
        <Year>2007
                <Month>January
                        . . .
                        <Date>23
                                <Dinner>
                                        <StartTime>18:00</StartTime>
                                        <EndTime>20:00</EndTime>
                                        <Location>Southern Dinner</Location>
310                                     <Companion>Jerry Allen</Companion>
                                        <Companion>Sue Edwards</Companion>
                                        <Companion>Billy Smith</Companion>
                                </Dinner>
                        </Date>
                . . .
```

FIG. 3A

Presence Information 300b

```
        <Person>Jerry Allen
330             <Location> Boston </Location>
                <Contact Method> Instant Message </Contact Method>
                <Contact Number> 555-555-1234 </Contact Number>
        </Person>
        <Person>Sue Edwards
332             <Location> New York City </Location>
334             <Contact Method> Instant Message </Contact Method>
                <Contact Number> 555-555-0235 </Contact Number>
        </Person>
        <Person>Billy Smith
                <Location> Boston </Location>
                <Contact Method> E-mail </Contact Method>
                <Contact Number> 555-555-6859 </Contact Number>
        </Person>
```

FIG. 3B

Cell Phone Screenshot 400

Welcome Joe Smith

Would you like to schedule Dinner this Friday night with your available Golf Buddies at The Southern Dinner?

Jerry Allen (Available)
Sue Edwards (Not Available – Out of Town)
Billy Smith (Available)

Yes   No

Cell Phone 410

800

Personal Services Information 900a

910

```
<Person> Betty Smith
    <Year>2007
        <Month> February
            . . .
            <Date> 15
                <Event>
                    <StartTime>19:15</StartTime>
                    <EndTime>21:05</EndTime>
                    <Title>Action Adventurer Domestic</Title>
                    <Location>Sunset Plaza Movie Co.</Location>
                    <Companion>John Drama</Companion>
                    <Companion>Molly Action</Companion>
                    <Companion>Holly Action</Companion>
                    <Companion>Larry Action</Companion
                </Event>
            </Date>
        . . .
```

FIG. 9A

Movie Information 900b

930

```
<Movie>Romantic Jane in the Jungle
    <Location> Boston Movie Co.
        <Rating>R</Rating>
        <Category>Romantic</Category>
        <StartTime>18:02</StartTime>
        <EndTime>20:15</EndTime>
    </Location>
</Movie>
. . .
```

935

```
<Movie>Action Adventure Oversees VII
    <Location> Sunset Plaza Movie Co.
        <Rating>R</Rating>
        <Category>Action</Category>
        <StartTime>19:03</StartTime>
        <EndTime>21:15</EndTime>
    </Location>
</Movie>
. . .
```

FIG. 9B

Cell Phone Screenshot 1000

Welcome Betty Smith
Four of Your Friends are Available for a Movie this Friday Night Friends Available Friday Night
John Drama -- Yes
Molly Action -- Yes
Holly Action – Has not Answered
Larry Action – Only if Holly Comes

Suggested Movie
Action Adventure Overseas Part VII
at 7:03pm
at Sunset Plaza Movie Co.
Yes    No    Only if Larry Comes Cell Phone 1010

PERSONAL SERVICE INTEGRATION ON A NETWORK

CROSS REFERENCES TO RELATED APPLICATIONS

This application relates to and is assigned to the same entity as the co-pending application, entitled "Service Integration on a Network" U.S. patent application Ser. No. 11/743,966, filed on May 3, 2007, the disclosure of which is hereby incorporated herein by reference.

FIELD OF THE INVENTION

The present invention relates generally to computer-based methods and apparatuses, including computer program products, for personal telecommunication service integration on a network.

BACKGROUND

Telecommunications networks are increasing in size and complexity. The increase in size and complexity of telecommunication networks is due in part to the increase in the number of telecommunication services and the increase in the number of users on telecommunication networks. New telecommunication services are added to telecommunication networks on a regular basis which adds to the size and complexity of the telecommunication network.

The telecommunication services communicate utilizing session initiation protocol (SIP) and internet protocol multimedia system (IMS). The communication of telecommunication services utilizing SIP and IMS and the number of telecommunications services needed to service the large number of users increases the complexity of the telecommunication network by dramatically increasing the communication messages on the network so that the different services can communicate with each other. The increased number of telecommunication services and the increased number of users causes a dramatic increase in the size and the complexity of the network. This increase in the network causes access to the network to become challenging if not impossible when new services are added and during peak periods of use by users.

SUMMARY OF THE INVENTION

One approach to personal service integration on a network is a method. The method includes monitoring a plurality of requests associated with a user, determining a first pattern based on the plurality of requests associated with the user, determining one or more telecommunication services from a plurality of telecommunication services based on the first pattern, and modifying the one or more telecommunication services based on information associated with the first pattern.

Another approach to personal service integration on a network is a computer program product. The computer program product is tangibly embodied in an information carrier. The computer program product includes instructions being operable to cause a data processing apparatus to monitor a plurality of requests associated with a user, determine a first pattern based on the plurality of requests associated with the user, determine one or more telecommunication services from a plurality of telecommunication services based on the first pattern, and modify the one or more telecommunication services based on information associated with the first pattern.

Another approach to personal service integration on a network is a system. The system includes a personal service module, a personal service server, and a service module. The personal service module monitors a plurality of requests associated with a user. The personal service server determines a first pattern based on the plurality of requests associated with the user and determine one or more telecommunication services from a plurality of telecommunication services based on the first pattern. The service module modifies the one or more telecommunication services based on information associated with the first pattern.

Another approach to personal service integration on a network is a system. The system includes a means for monitoring a plurality of requests associated with a user, a means for determining a first pattern based on the plurality of requests associated with the user and determining one or more telecommunication services from a plurality of telecommunication services based on the first pattern, and a means for modifying the one or more telecommunication services based on information associated with the first pattern.

In other examples, any of the approaches above can include one or more of the following features. In some examples, the one or more telecommunication services determined based on a request received from a user. The request received from the user is received by a digital personal assistant module. Processing the request includes using speech recognition, handwriting recognition, and/or text processing.

In other examples, a future request associated with a user based on the first pattern is determined and whether to process the future request based on a user response is determined.

In some examples, a digital personal assistant module queries the user regarding the future request and the user response associated with the future request is received.

In other examples, a pre-existing template is selected and the pre-existing template is modified based on the first pattern. The modifying includes generating a first template based on the first pattern. A second pattern based on the plurality of requests associated with a user is determined.

In some examples, the first pattern is associated with a first telecommunication service and the second pattern is associated with a second telecommunication service. The one or more telecommunications services includes a message service, a presence status service, a calendar service, a message transmission and receiving service, a conference service, a location identification service, a social attribute identification service, a business communication service, an entertainment service, an information service, an electronic mail service, a phone service, a voicemail service, a television service, and/or a storage service.

In other examples, the first pattern is stored in a storage module. A pre-existing template is selected and the pre-existing template is modified based on the first pattern stored in the storage module.

In some examples, the personal service server receives a request from a user and determines the one or more telecommunication services from the plurality of telecommunication services based on the request from the user. A voice to text module converts the request from the user from a vocal request to a text based request.

In other examples, the personal service server determines a future request associated with a user based on the first pattern and determines whether to process the future request based on a user response. A storage module stores the first pattern and/or the plurality of requests. A virtual personal assistant module receives requests from the user an/or queries the user regarding a future request.

An advantage to the personal service integration on a network is that a user's needs can be effectively managed by combining the user's communication, information sharing, and entertainment needs together to form a synergistic combinations of services. Another advantage to the personal service integration on a network is that a diverse set of user communication preferences and patterns can be utilized to determine the usage patterns of the user. For example, the user preferences for the user's cell phone, computer, and/or television can be combined with the usage from the user's cell phone, computer, and/or television to determine the usage patterns of the user.

Another advantage to the personal service integration on a network is that the personal service server can be implemented on a carrier network (e.g., phone, television, and cell phone network) which allows for a plurality of forms of communication and interactions to be monitored and controlled by the personal service server. An additional advantage to the personal service integration on a network is that the personal service server can manage the user's needs while utilizing the user's social attributes, preferences, and privacy settings.

Another advantage to the personal service integration on a network is that the personal service server can process the user requests, determines usage patterns, and processes usage patterns on the network side of the user transactions which allows for a holistic view of the user interactions. An additional advantage to the personal service integration on a network is that the personal service server and the personal service interface on the computing device can blend speech recognition, rich animated graphics, and intelligence in the service network to manage the subscriber's complex, multidimensional interactions at the touch of a button and/or at an utterance of a command.

Another advantage to the personal service integration on a network is that services can be integrated together to allow for the personal service server to have information regarding presence, location, policies, and/or user preferences. Another advantage to the personal service integration on a network is that new combinations of services can be added to allow for the synergistic integration of services on the network. An additional advantage to the personal service integration on a network is that different networks can utilize the same services through the personal service server which allows for a cross-platform use of services. For example, a first user on a wireless network can utilize the same calendar and conference services as a second user on a wired network.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 3A is a diagram of exemplary personal service information according to an embodiment of the invention.

FIG. 3B is a diagram of exemplary presence information according to an embodiment of the invention.

FIG. 9A is a diagram of exemplary personal services information according to an embodiment of the invention.

FIG. 9B is a diagram of exemplary movie information according to an embodiment of the invention.

DETAILED DESCRIPTION

In general overview, a personal service monitors and stores user requests for services. The stored user requests are processed to determine usage patterns. The personal service processes the usage patterns to determine future requests (e.g., The personal service asks: Do you want to have dinner with your golf buddies on Friday night at the country club?) and/or to determine how to fulfill a request (e.g., You tell the personal service: Schedule dinner with my golf buddies on Friday night at our favorite restaurant.) The personal service processes the request.

Figure 1:
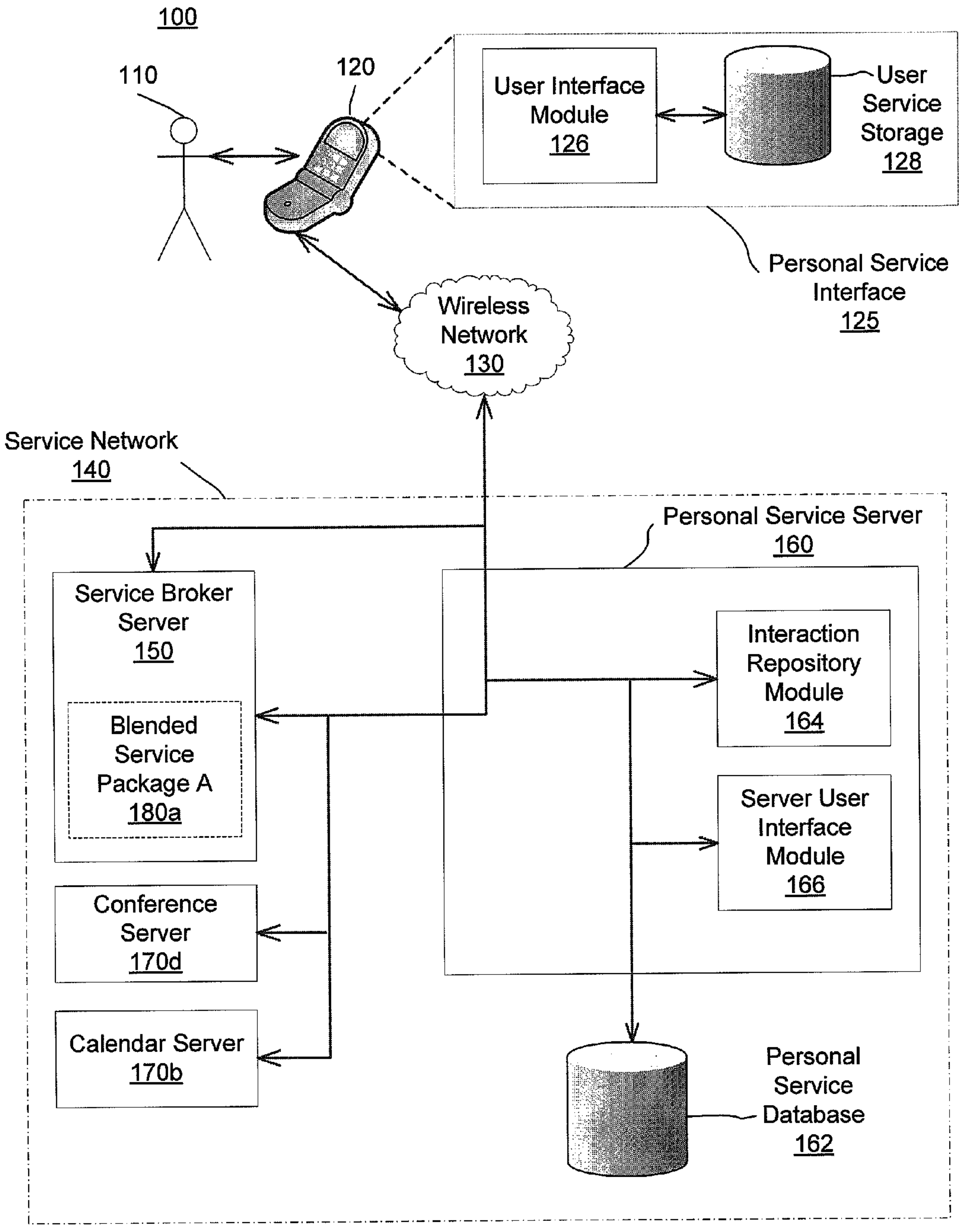
FIG. 1 is a functional block diagram of an exemplary system illustrating the interactions between a user and a personal service server according to an embodiment of the invention.

FIG. 1 is a functional block diagram of an exemplary system 100 illustrating the interactions between a user 110 and a personal service server 160. The user 110 utilizing a computing device 120 accesses a service network 140 through a wireless network 130. The computing device 120 includes a personal service interface 125. The personal service interface 125 includes a user interface module 126 and a user service storage 128. In some examples, the user interface module 136 and the user service storage 128 are part of the included user interface and storage of the computing device 120.

The service network 140 includes a service broker server 150, a personal service server 160, a personal service database 162, and/or service servers 170*b* and 170*d* (generally 170). The service broker server 150 includes one or more blended service packages (e.g., 180*a*). The personal service server 160 includes an interaction repository module 164 and a server user interface module 166. The service servers 170 include a presence server, a conference server 170*d*, a calendar server 170*b*, a collaboration server, an IM server, a location server, other types of servers associated with services for users, and/or other types of servers associated with services for networks. Another advantage is that different services can be integrated together to allow the personal service server to have a holistic view of the user's interactions which allows for a synergistic personal integration of services on the network that are configured for the user.

The user 110 makes user requests by utilizing the personal service interface 125 associated with the computing device 120. The personal service interface 125 monitors the user request and sends the user request to the server user interface module 166 for processing. The personal service server 160 processes the user request and returns information associated with and/or requested in the user request. The server user interface module 166 monitors the user requests and stores the user requests in the personal service database 162. The interaction repository module 164 processes one or more stored user requests in the personal service database 162 to determine one or more usage patterns.

In other examples, the server user interface module 166 stores the usage patterns in the personal service database 162. In some examples, the interaction repository module 164 processes the usage patterns to determine future requests. The user interface module 126 requests confirmation for the future request from the user 110 through the user's computing devices 120. Upon the user's confirmation for the future request, the personal service server 160 processes the future user request.

In some examples, the user 110 makes a user request by utilizing the personal service interface 125 associated with the computing device 120. The personal service server 160 processes the user request. The processing by the personal service server 160 includes processing the usage patterns to determine the parameters of the user request. Upon determining the parameters of the user request, the personal service server 160 processes the user request.

In other examples, the server user interface module 166 monitors the user requests and stores a set of the user requests in the personal service database 162. The set of the user requests that are stored in the personal service database 162 is determined based on the usage information stored in the personal service database 162, user subscription information (e.g., personal subscription, corporate subscription), information associated with the service network 140, usage patterns (e.g., conference scheduling, events), predetermined standard usage patterns, and/or other information that identifies usage patterns unique to a user 110. Another advantage is that the personal service server processes the user requests, determines usage patterns, and processes usage patterns on the network side of the user transactions which allows.

In some examples, the user interface module 126 monitors the user requests. The user interface module 126 stores a set of the user requests in the user service storage 128. The set of the user requests that are stored in the user service storage 128 is determined based on the client side interactions of the user (e.g., favorites stored on the user's computing device), storage space on the user service storage 128, and/or other information that is associated with user interactions with the computing device 120. For example, the user favorites, local contacts, and/or other information that is not communicated to the personal service server 160 is stored in the user service storage 128. An advantage is that information that can not be monitored by the personal service server 160 but can be monitored by the user interface module 126 can be utilized to determine usage patterns for the user.

In other examples, the user interface module 126 communicates with the server user interface module 166 to communicate the user request information stored in the user service storage 128 to the personal service database 162. The communication of the user request information can be scheduled, for example, to occur on a predetermined, recurring basis (e.g., every hour, every twenty four hours). The user request information can be dynamically updated, for example, based on the amount of user request information stored in the personal service database 162 (e.g., addition of 10 kilobytes of data, addition of 10 megabytes of data) and/or based on predetermined user interactions (e.g., addition of ten new contacts).

In some examples, the one or more services utilized to fulfill a user request are determined based the user's usage pattern. For example, the user's usage pattern indicates that the user has dinner with his golf buddies every Thursday night. Based on the user's usage pattern, the personal service server 160 determines that that the calendar server **170*b* and the message server should be utilized to fulfill the user's request. In other examples, the personal service server 160 utilizes one or more blended service packages (e.g., 180*a***) to determine the one or more services that are utilized based on the user's usage pattern.

In other examples, the processing of the user request by the personal service server 160 includes determining one or more services that can be utilized to fulfill the user's request. For example, the user request is to setup a conference call with two people. Based on the user request, the personal service server 160 determines that that the presence server and the conference server **170*d* should be utilized to fulfill the user's request. In other examples, the personal service server 160 utilizes one or more blended service packages (e.g., 180*a***) to determine the one or more services that are utilized to fulfill the user's request.

In some examples, the personal service server 160 communicates with the personal service database 162 to determine the usage patterns of other users associated with the user's request. The personal service server 160 can determine, for example, actions associated with the user's request based on the usage patterns and/or preferences of other users (e.g., automatically accept usage pattern for Ed's invitations, do not use usage patterns for Howard's invitations). For example, Bill invites his friend, Al, to dinner every Friday night and Al's acceptances of the dinner invitation are stored in the personal service database 162. When Bill invites Al to dinner on Friday night, the personal service server 160 communicates with the personal service database 162 to determine the pattern for Al's acceptances of Bill's dinner invitation (e.g., always accepts, only accepts on the first Friday of the month). Based on Al's usage pattern, the personal service server 160 can accept or reject Bill's dinner invitation (e.g., if Al only accepts on the first Friday of the month, then all dinner initiations on other Fridays are automatically rejected). An advantage is that the user's preferences and/or usage history can be utilized to customize the user interactions with the personal service server 160.

The computing device 120 can be, for example, a cell phone, a computer, a television with set top box, other types of display devices with input devices, and/or other types of audio devices with audio input devices. Another advantage is that a diverse set of user communication preferences and patterns from the various user computing devices can be combined to determine the usage patterns of the user.

Although a wireless network 130 is illustrated in the exemplary system 100, the wireless network 130 can be, for example, a wired network, a cable television network, a computer network, a packet based network, an asynchronous transfer mode (ATM) network, and/or a circuit based network, including a landline telephone network, a cellular network, a personal communications service (PCS) network, a global system for mobile communication (GSM) network, an enhanced general packet radio service (EDGE) network, and other public switched telephone network (PSTN) type networks. Another advantage is that the personal service server can be implemented on different types of networks which allows for a plurality of forms of communication and interactions to be monitored and controlled by the personal service server.

In some examples, the service network 140 is a carrier network. The carrier network can be, for example, a telephone network (e.g., public switched telephone network (PTSN)), a television network (e.g., satellite network, fiber optic network, coaxial cable network), a cell phone network (e.g., PCS network, GSM network), and/or any other type of network that provides services to users. Another advantage is that the personal service server is implemented on a carrier network which allows for a plurality of forms of communication and interactions to be monitored and controlled by the personal service server.

In some examples, the service is a message service, a presence status service, a calendar service, a message transmission and receiving service, a conference service, a location identification service, a social attribute identification service, a business communication service, an entertainment service, an information service, an electronic mail service, a phone service, a voicemail service, a television service, and/or a storage service. Another advantage is that the services can be integrated together to enable the personal service server to utilize information regarding the different services (e.g., message, presence, calendar, conference) to provide customized, personal service to the users of the personal service server.

In other examples, the user service storage 128 is non-volatile memory or volatile memory. For example, the user service storage 128 is a flash memory drive, a hard drive, and/or any other type of storage module. In some examples, the personal service database 162 is stored in non-volatile memory or volatile memory. For example, the personal service database 162 is stored on a hard drive, a network area storage device, and/or any other type of storage module.

The processing of the user requests by the personal service server 160 includes utilizing a plurality of services 170 and/or a service broker server 150. In some examples, services 170 (e.g., calendar, television, phone, location) on the service network 140 are utilized by the personal service server 160 to request information and/or perform tasks. In other examples, services 170 on the service network 140 are utilized by the service broker server 150 and/or the blended service package 180. The service broker server 150 and blended service package 180 are described in U.S. patent application, entitled "Service Integration on a Network," U.S. patent application Ser. No. 11/743,966, filed on May 3, 2007, which is incorporated by reference.

In other examples, the blended service package 180 is a template that specifies the services that are available for use in the personal service integration. A blended service package can be selected, for example, from a plurality of blended service packages based on the user request and/or the usage pattern. The execution of the blended service package can be modified, for example, based on the user request and/or the usage pattern. For example, the usage pattern may indicate that a first user always calls a second user's cell phone and never calls the second user's office phone. When the first user calls the second user, the execution of the service codelets is modified so that the second user's location is not checked even though the selected blended service package by default checks every user's location before placing a call. In some examples, a blended service package is generated based on a usage pattern.

Figure 2:
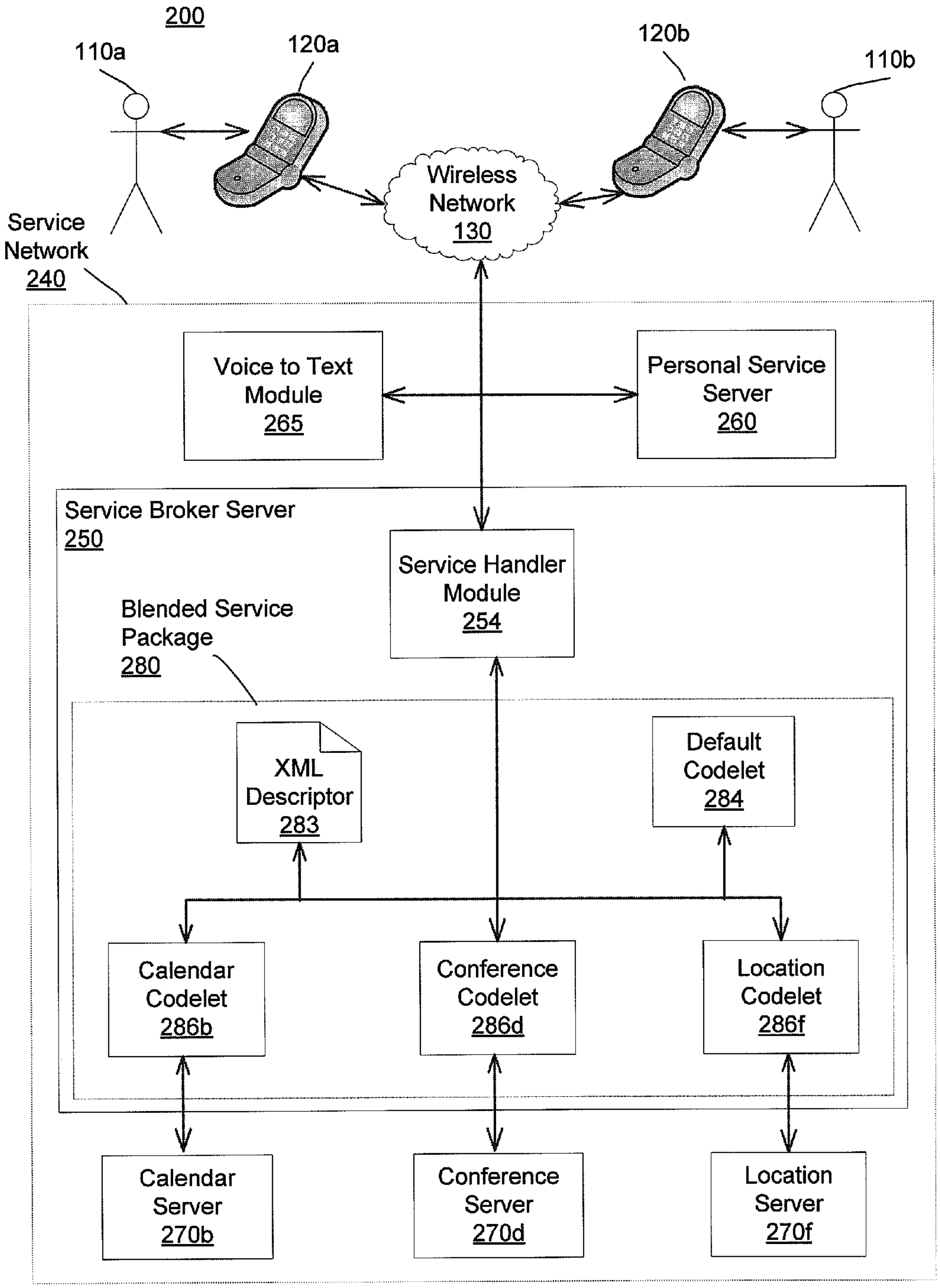
FIG. 2 is a functional block diagram of an exemplary system illustrating the interactions between users and a personal service server according to an embodiment of the invention.

FIG. 2 is a functional block diagram of an exemplary system illustrating the interactions between users 110*a* and 110*b* (generally 110) and a personal service server 260. A user 110 utilizing a computing device 120*a* or 120*b* (generally 120) accesses a service network 240 through a wireless network 130. The service network 240 includes a voice to text module 265, a personal service server 260, a service broker server 250, a calendar server 270*b*, a conference server 270*d*, and a location server 270*f*. The service broker server 250 includes a service handler module 254 and a blended service package 280. The blended service package 280 includes an XML descriptor file 283, a default codelet 284, a calendar codelet 286*b*, a conference codelet 286*d*, and a location codelet 286*f*. The service broker server 250 and blended service package 280 are described in U.S. patent application, entitled "Service Integration on a Network," U.S. patent application Ser. No. 11/743,966, filed on May 3, 2007, which is incorporated by reference.

The user 110 utilizing the computing device 120 makes a request through the wireless network 130. The personal service server 260 receives the request and communicates with the service handler module 254. The service handler module 254 receives the request and calls a default codelet 284 associated with a blended service package 280 that is associated with the user 110. The service handler module 254 dynamically calls a plurality of service codelets (e.g., 286*b*) that are needed to fulfill the user's request. Each called service codelet (e.g., 286*b*) communicates with a service server (e.g., 270*b*) to receive, update, and/or add information associated with the user request.

The service codelet (e.g., 286*b*) returns information associated with the request to the service codelet (e.g., 286*b*) which communicates the information to the service handler module 254. The service handler module 254 returns the information associated with the request to the personal service server 260. The personal service server 260 processes the information and communicates with the user 110.

Although FIG. 2 provides only one exemplary blended service package 280, a plurality of blended service packages can be utilized, for example, by the service broker server 250. A blended service package can be selected, for example, from the plurality of blended service packages based on the request, user preferences, information associated with the service network 240, and/or information associated with the user 110.

In some examples, the voice to text module 265 receives audio requests (e.g., speech, audio, vocal, verbal communication) from the user 110 and converts the audio requests to non-audio requests (e.g., text). An advantage is that different types of requests can be utilized by the service network 240 to provide integrated services to users 110. In other examples, an input module (not shown) receives requests from the user 110 and processes the request. The processing includes, for example, handwriting recognition (e.g., converting handwriting to text based request) and/or text processing (e.g., optical character recognition, text parsing).

In some examples, the default codelet 284 dynamically calls the service codelets (e.g., 286*b*) to request information from the associated services (e.g., 270*d*) (e.g., calendar data) and/or perform tasks with the associated services (e.g., 270*d*) (e.g., update calendar). In other examples, the service codelets (e.g., 286*d*) can dynamically call other service codelets (e.g., 286*f*) based on the results of their requests for information. In yet other examples, the information from the services (e.g., 270*d*) is integrated and returned to the user 110.

In some examples, the blended service package 280 is determined based on the user's preferences, a service package associated with the user, and/or other configuration information associated with the user. A user can be, for example, associated with one or more blended service packages (e.g., 280). For example, a user can be associated with a corporate blended service package which provides business type services (e.g., messaging, phone forwarding, calendar) and a personal blended service package which provides personal type services (e.g., ringback, social attributes). If the user made a request for a meeting with her boss at 3:00 pm on a Monday, then based on configuration data associated with the service package (e.g., business hours are Monday through Friday 8:00 am to 5:00 pm) the corporate blended service package would be utilized for the user request. If the user made a request for dinner reservations for four at 8:00 pm on a Saturday, then based on the user's preferences (e.g., all reservations on the weekend are personal) the personal blended service package would be utilized. Another advantage is that the different blended service packages allow for a user to select default options, default actions, and/or service levels for the user's account.

FIG. 3A is a diagram of exemplary personal service information 300*a*. The personal service information 300*a* includes information for dinner 310. The calendar information for dinner 310 includes start time, end time, location, and companions for the dinner.

FIG. 3B is a diagram of exemplary presence information 300*b*. The presence information 300*b* includes presence information for individuals. The presence information includes location information 330 and 332 and contact information 334 for the individuals.

Figure 4:
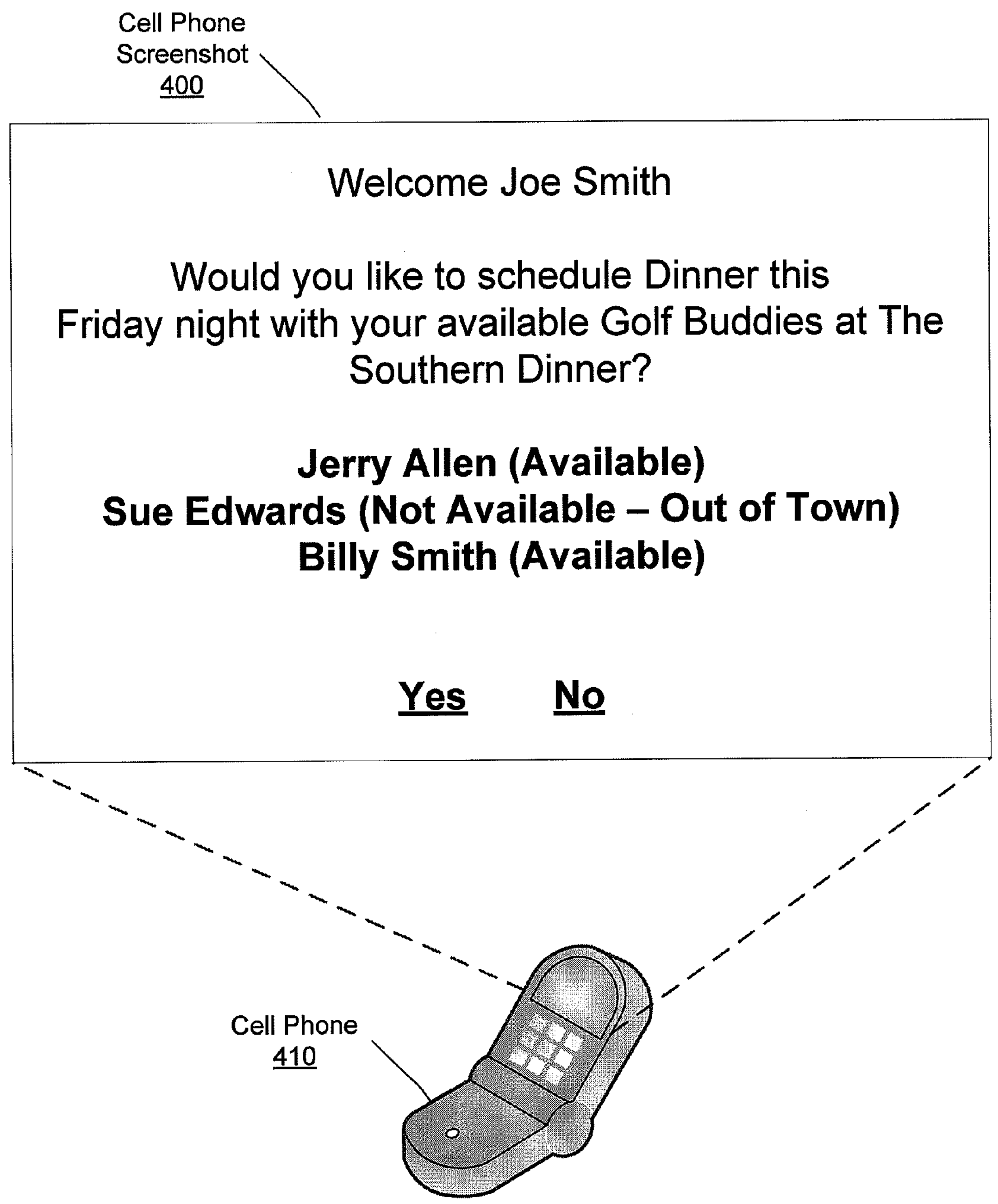
FIG. 4 is an exemplary screenshot illustrating the interaction between a user and a personal service server according to an embodiment of the invention.

FIG. 4 is an exemplary screenshot 400 illustrating the interaction between a user 110 and a personal service server 160 through the exemplary system 100 of FIG. 1. The interaction repository module 164 determines a future request based on the user requests stored in the personal service database 162. The personal service server 160 communicates with the personal service interface 125 on the user's computing device 120 to determine if the user 110 wants to proceed with the future request. Upon confirmation of the future request, the personal service server 160 processes the future request through the service broker server 150 or the service servers (e.g., 170*d*).

For example, Joe Smith has dinner with his golf buddies every Friday night at the South End Country Club Restaurant at 7:15 pm. For the past four Thursdays, Joe has sent an instant message to his golf buddies, Jerry Allen, Sue Edwards, and Billy Smith, to ask if they want to have dinner on Friday. The golf buddies reply and Joe makes reservations at the South End Country Club Restaurant for 7:15 pm. Each of the previous user requests by Joe (e.g., instant messages, reservations) were monitored by the interaction repository module 164 and the user requests were stored in the personal service database 162. The interaction repository module 164 processes the user requests to determine a usage pattern (e.g., dinner with golf buddies every Friday night). On the next Thursday, the personal service server 160 processes the usage patterns stored in the personal service database 162 and determines that Joe has dinner with his golf buddies every Friday night at 7:15 pm at the South End Country Club Restaurant. The personal service server 160 communicates with a calendar server 170*b* to determine if Joe's golf buddies are available. The personal service server 160 asks Joe if he wants to have dinner with his golf buddies again on Friday night at 7:15 pm at the South End Country Club Restaurant. Joe replies to the query through his computing device 120 (e.g., cell phone) with a "Yes." The personal service server 160 communicates with the instant message server (not shown) to ask Joe's golf buddies if they want to have dinner on Friday. The personal service server 160 communicates with a business server (not shown) to make reservations for Joe and his golf buddies at the South End Country Club Restaurant at 7:15 pm on Friday.

Figure 5:
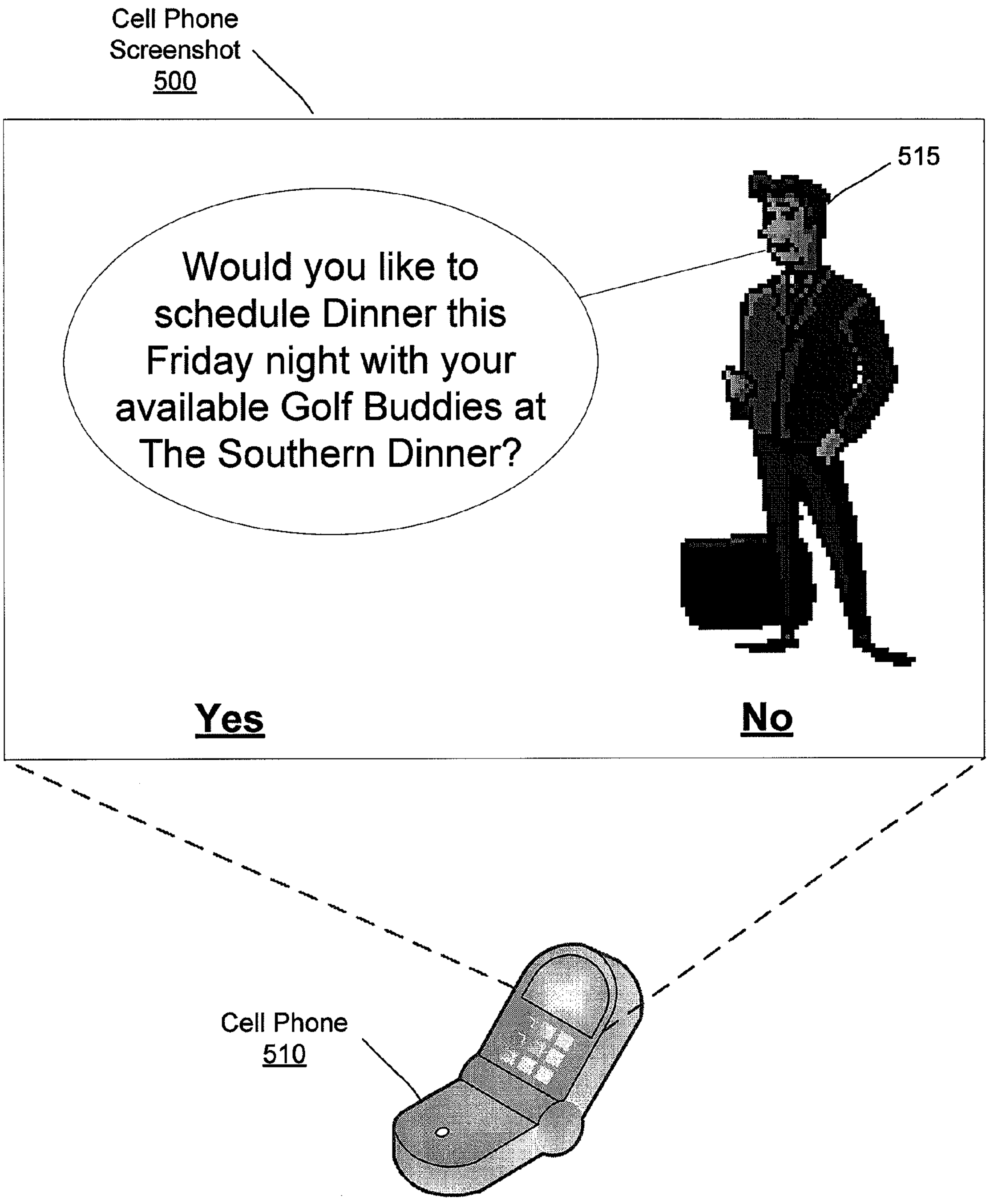
FIG. 5 is an exemplary screenshot illustrating the interaction between a user and a personal service server depicting a digital personal assistant according to an embodiment of the invention.

FIG. 5 is an exemplary screenshot 500 illustrating the interaction between a user 110 and a personal service server 160 through the exemplary system 100 of FIG. 1 utilizing a digital personal assistant through a cell phone 510. The digital personal assistant is a graphical representation of the personal service interface 125. In other examples, one user's digital personal assistant communicates with another user's digital personal assistant to process requests and/or make requests. In some examples, the digital personal assistant is a graphical representation 515 of the personal service interface 125 selected by the user 110 from a library of graphical representations (e.g., dog, cat, animal, cartoon character). In other examples, the interaction between the user 110 and the digital personal assistant includes receiving user requests and/or confirming future requests through a digital personal assistant module (not shown). In some examples, the digital personal assistant is a digital avatar which represents the user's identity, experience, and/or personality. An advantage is that the subscriber's communication, information sharing, and entertainment needs are customized based on the usage patterns of the user, the user's identity, experience, and/or personality.

In some examples, each user has a digital avatar that is personalized for the user. The personalization of the digital avatar includes determining the user's social attributes, preferences, and/or privacy settings. The digital avatar can be utilized, for example, across a plurality of computing devices (e.g., cell phone, computer). Another advantage is that the user will utilize the same user interface across a plurality of computing devices to blend speech recognition, rich animated graphics, and intelligence in the service network to manage the subscriber's complex, multidimensional interactions at the touch of a button and/or at an utterance of a command.

Figure 6:
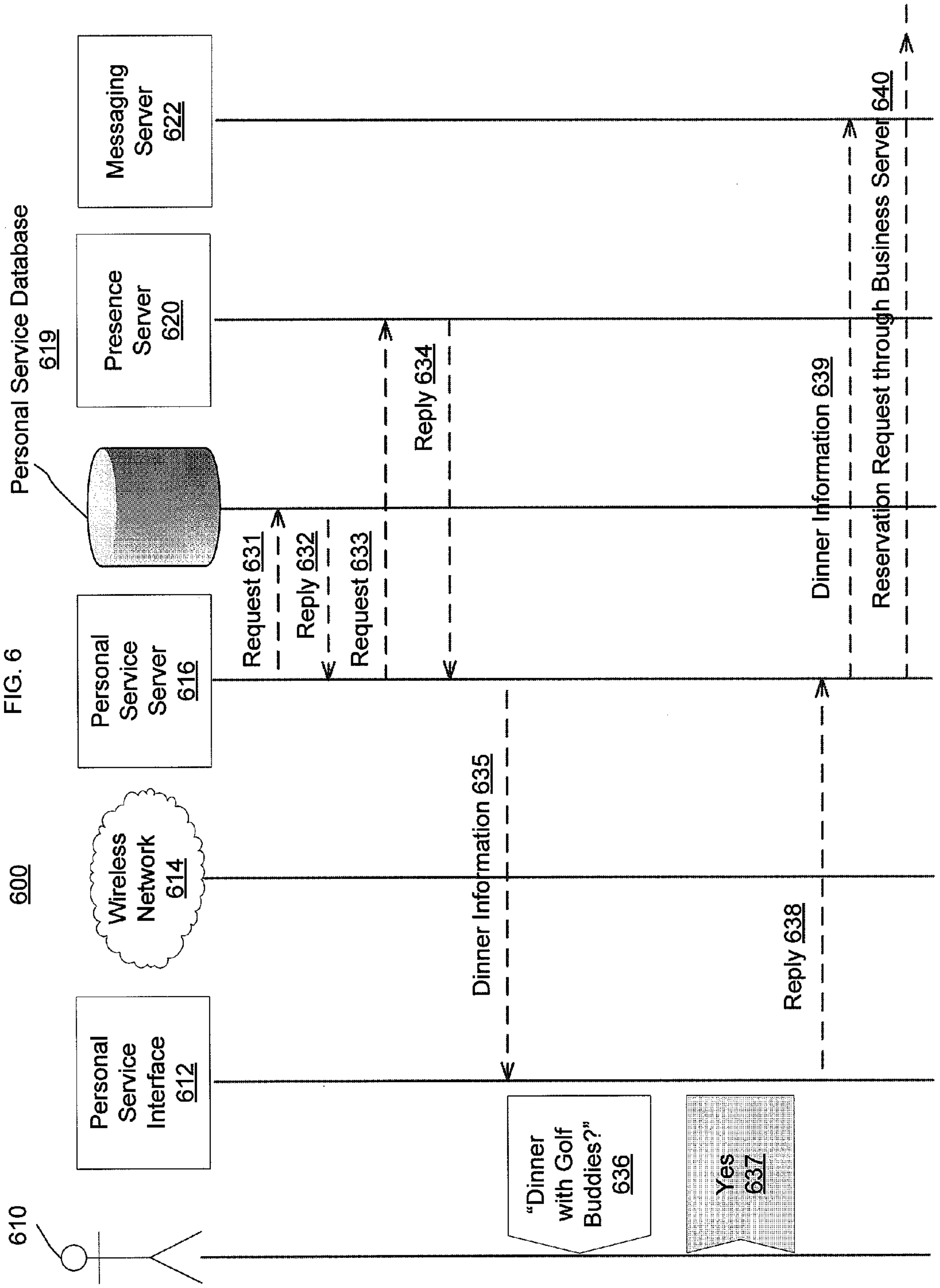
FIG. 6 is a process diagram illustrating the processing of a future request generated by the personal service server according to an embodiment of the invention.

FIG. 6 is a process diagram 600 illustrating the processing of a future request generated by a personal service server 616 utilizing the personal service information 300*a* in FIG. 3A and the presence information 300*b* in FIG. 3B. The personal service server 616 sends a request 631 to the personal service database 619 for personal service information 300*a* associated with the user 610. The personal service database 619 replies 632 with the personal service information 300*a* associated with the user 610 including the user's dinner information 310. The personal service server 616 determines a future request based on the personal service information 300*a*. The personal service server 616 requests 633 presence information from a presence server 620 for the individuals associated with the future request (e.g., Jerry Allen). The presence server 620 replies 634 with presence information 300*b* for the individuals associated with the future request. The presence information 300*b* includes location information 330 and 332 (e.g., New York City) and contact information 334 (e.g., Instant Message).

The personal service server 616 processes the presence information 300*b* and communicates the dinner information 635 (e.g., Dinner with Golf Buddies?) to the personal service interface 612 on the user's computing device through a wireless network 614. The personal service interface 612 communicates the future request 636 to the user 610. The user 610 responds 637 ("Yes") to the inquiry regarding the future request 636. The personal service interface 612 replies 638 to the personal service server 616 through the wireless network 614. The personal service server 616 processes the reply from the user 610 and communicates dinner information 639 to the messaging server 622. The messaging server 622 communicates the dinner information to the individuals associated with the request based on the contact information (e.g., 334) in the presence information 300*b*. The personal service server 616 communicates a reservation request 640 to a business server (not shown) to place a reservation at the restaurant.

Figure 7:
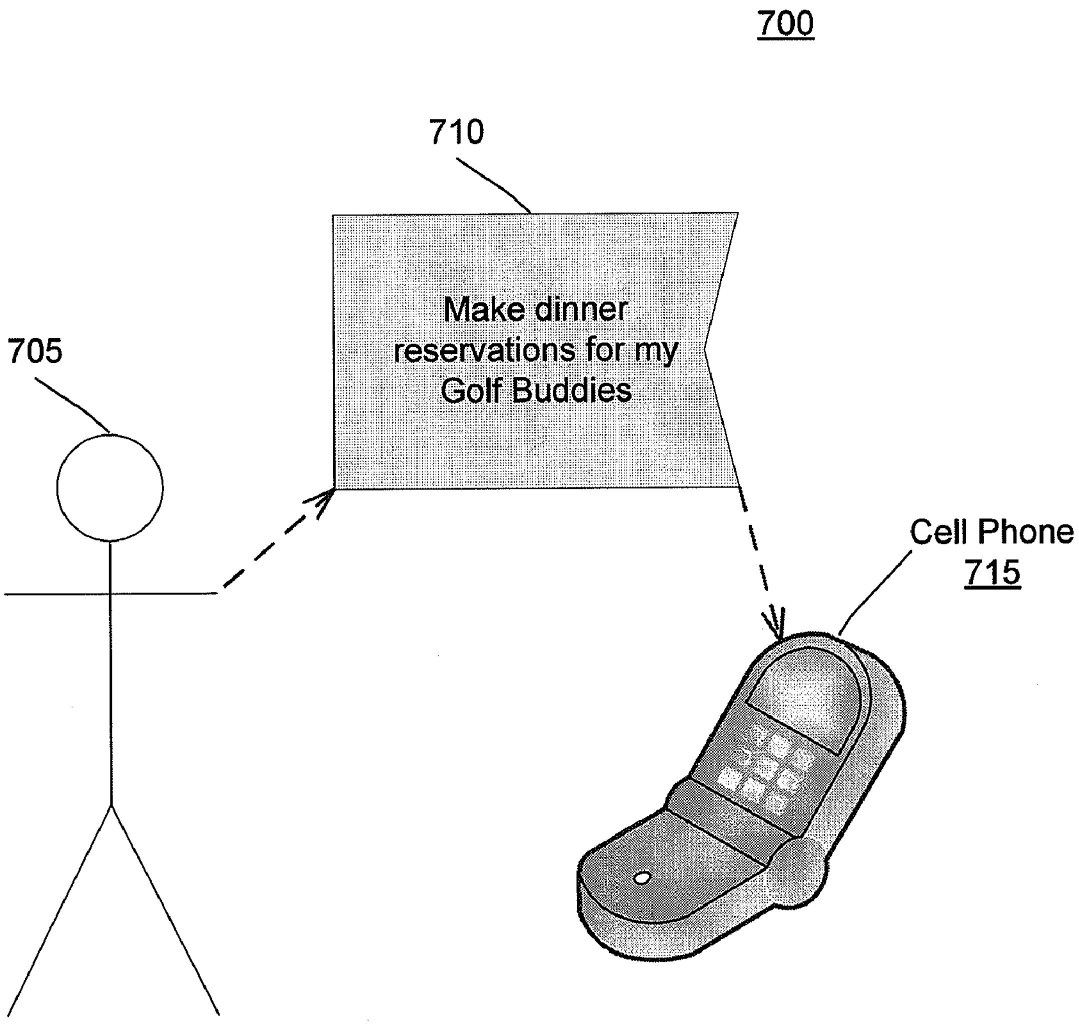
FIG. 7 is a diagram of an exemplary request by a user according to an embodiment of the invention.

FIG. 7 is a diagram of an exemplary request 710 by a user 705. The user 705 makes a request 710 utilizing the user's cell phone 715. The cell phone 715 communicates through a wireless network 130 to a personal service server 160 to process the request of FIG. 1.

Figure 8:
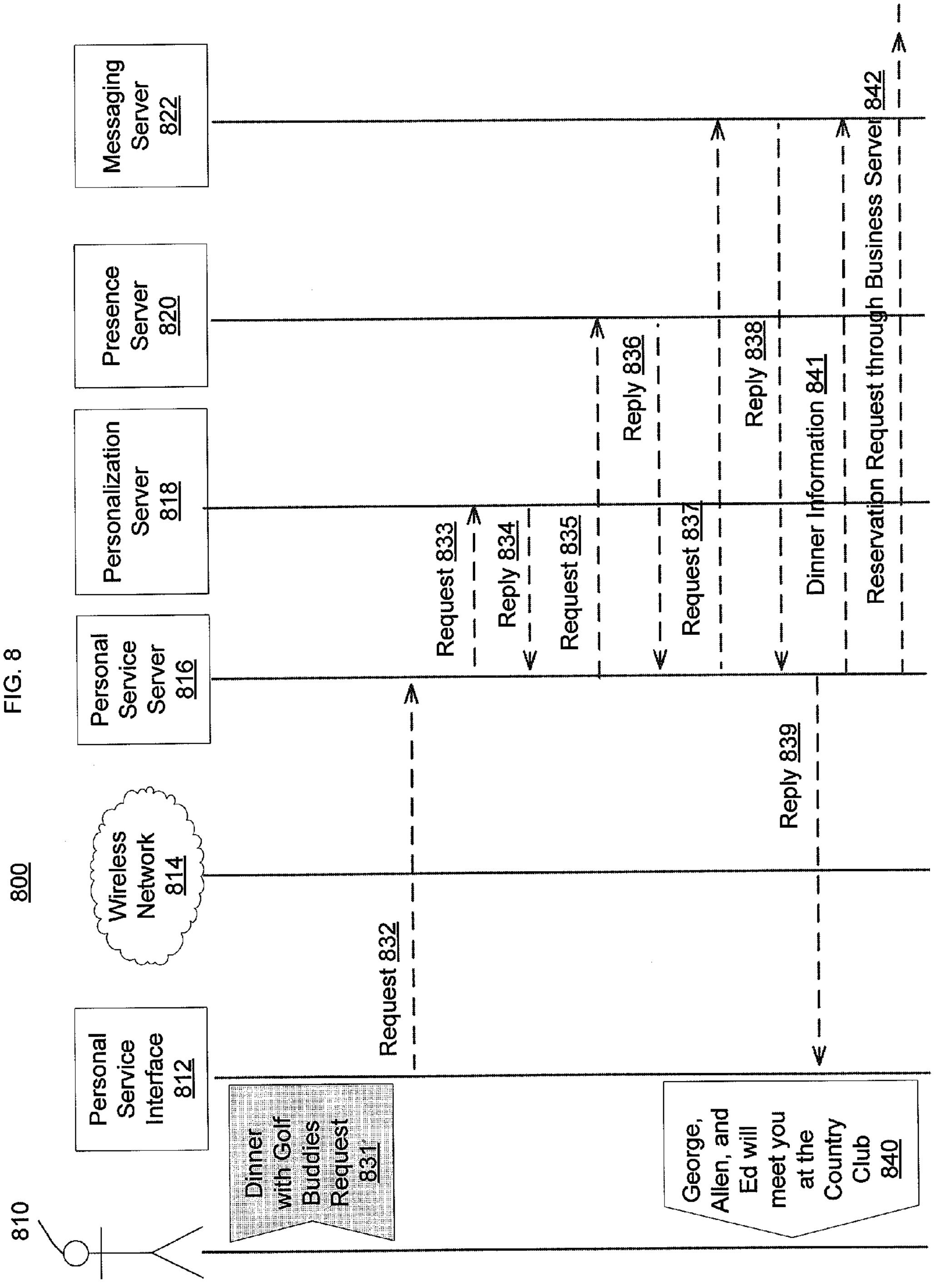
FIG. 8 is a process diagram illustrating the processing of a user request according to an embodiment of the invention.

FIG. 8 is a process diagram 800 illustrating the processing of a user request 831. The user 810 makes a request 831 (e.g., Make dinner reservations with my Golf Buddies) using the personal service interface 812 of the user's computing device (not shown). The personal service interface 812 communicates the request 832 through a wireless network 814 to a personal service server 816. The personal service server 816 processes the request 832 and makes a request 833 to a personalization server 818 to determine the user's golf buddies. The personalization server 818 replies 834 with the requested information regarding the user's golf buddies.

The personal service server 816 requests 835 presence information regarding the user's golf buddies from the presence server 820. The presence server replies 836 to the request with presence information (e.g., 300*b* in FIG. 3B) for the user's golf buddies. Based on the presence information (e.g., who is in town, who is not in town), the personal service server 816 communicates a request 837 to a message server 822. The message server 822 communicates with the user's golf buddies who are available (e.g., in town) to determine if the user's golf buddies want to go to dinner. The messaging server 822 replies 838 to the personal service server 816 with information regarding which of the user's golf buddies wants to go to dinner.

The personal service server 816 replies 839 to the user's request 832 with the dinner information. The personal service interface 812 communicates the reply 840 (e.g., George, Allen, and Ed will meet you for dinner at the country club) to the user 810 utilizing the user's computing device. The personal service server 816 communicates the dinner information 841 to the messaging server 822. The message server 822 communicates the dinner information 841 to the user's golf buddies utilizing the contact information (e.g., 334 in FIG. 3B) from the presence server 820. The personal service server 816 communicates a reservation request 842 to a business server (not shown) to place a reservation at the restaurant.

For example, Joan Smith makes a user request 831 utilizing the personal service interface 812 on her cell phone to the service broker server 816. The user request 831 is to make dinner reservations for my golf buddies. The personal service server 816 communicates 833 with a personalization server 818 to request information regarding Joan's golf buddies, where Joan and her golf buddies go to dinner, and when Joan and her golf buddies go to dinner. The personalization server 818 returns 834 information regarding Joan's golf buddies (e.g., Jerry Allen, Sue Edwards, and Billy Smith), where they go to dinner (e.g., Country Club), and when they go to dinner (e.g., every Wednesday night at 6:45 pm). The personal service server 816 communicates 835 with the presence server 820 to determine the location of Joan's golf buddies. The presence server 820 returns 836 information regarding the location and availability of Joan's golf buddies. The personal service server 816 communicates with the messaging server 822 to communicate with Joan's golf buddies to determine if they want to go with Joan to dinner. The personal service server 816 sends a message 839 to Joan to tell her the details regarding dinner with her golf buddies (e.g., Jerry, Sue, and Billy will join you for dinner Wednesday night at 6:45 pm at the Country club) and communicates 841 with the messaging server 822 to communicate to Joan's golf buddies the details regarding the dinner reservation. The personal service server 816 sends a communication 842 to a business server (not shown) to request reservations at the Country Club for four people on Wednesday night at 6:45 pm.

FIG. 9A is a diagram of exemplary personal services information 900*a*. The personal services information 900*a* includes event information 910. The event information 910 includes start time, end time, title, and/or companion information.

FIG. 9B is a diagram of exemplary movie information 900*b*. The movie information 900*b* includes individual movie information 930 and 935. The individual movie information 930 and 935 includes location, rating, category, start time, and/or end time.

Figure 10:
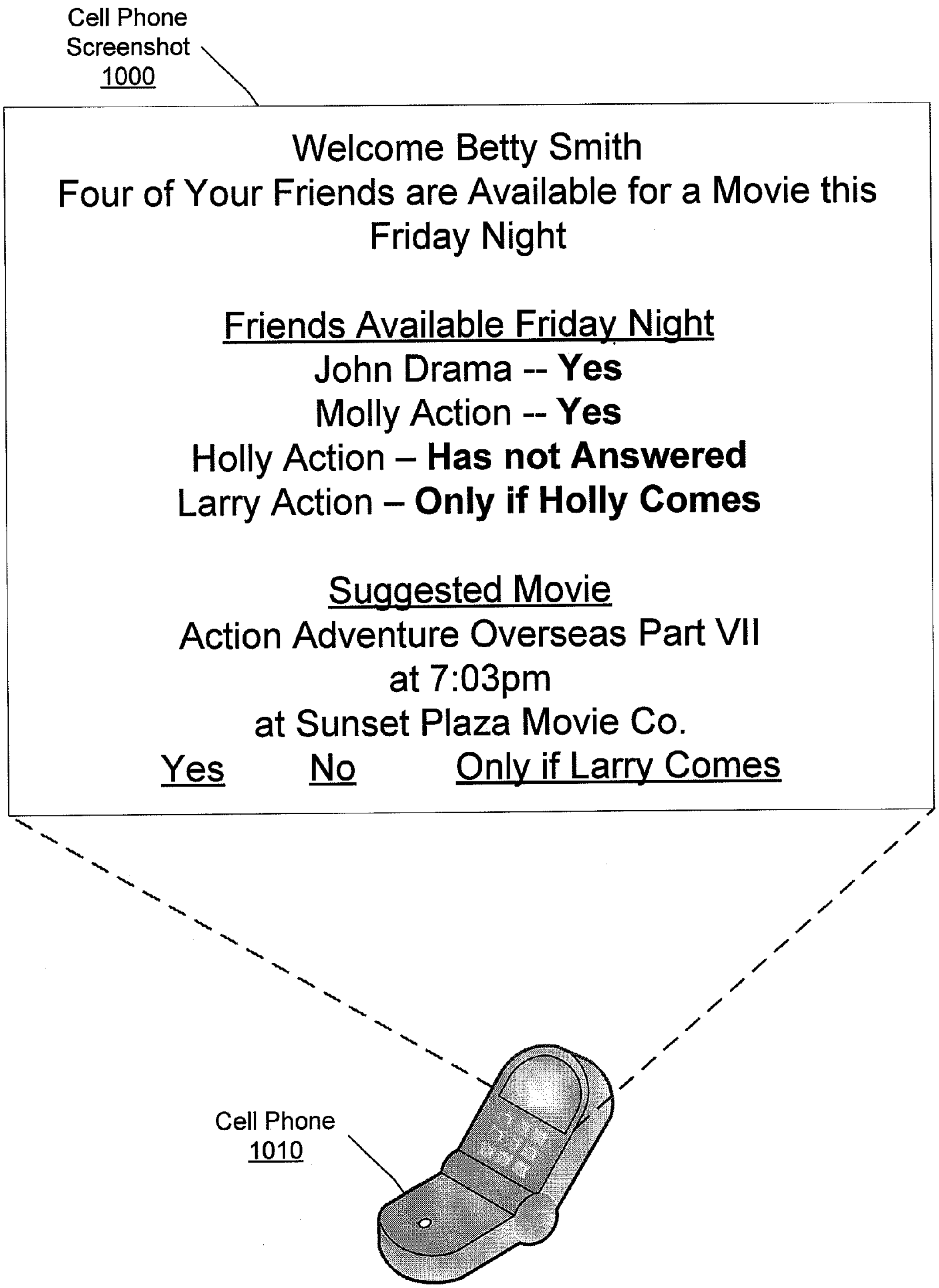
FIG. 10 is an exemplary screenshot illustrating the interaction between a user and a personal service server according to an embodiment of the invention.

FIG. 10 is an exemplary screenshot 1000 illustrating the interaction between a user and a personal service server (not shown) through the user's cell phone 1010. The interaction includes information regarding a request (e.g., friends available Friday night, suggested movie).

In some examples, the personal service server communicates with the personal service database to determine the usage patterns of other users associated with the user's request. The personal service server can determine, for example, usage patterns and/or preferences of other users (e.g., Bill prefers horror movies, Al prefers action movies). For example, Bill invites his friend, Al, to a movie every Friday night and Al's acceptances of the movie invitations are stored in the personal service database. When Bill invites Al to an action movie on Friday night, the personal service server communicates with the personal service database to determine the pattern for Al's acceptances of Bill's movie invitation (e.g., always accept action movies, only accepts horror movies once a month). Based on Al's usage pattern, the personal service server can accept or reject Bill's movie invitation (e.g., accept Bill's movie invitation of an action movie).

Figure 11:
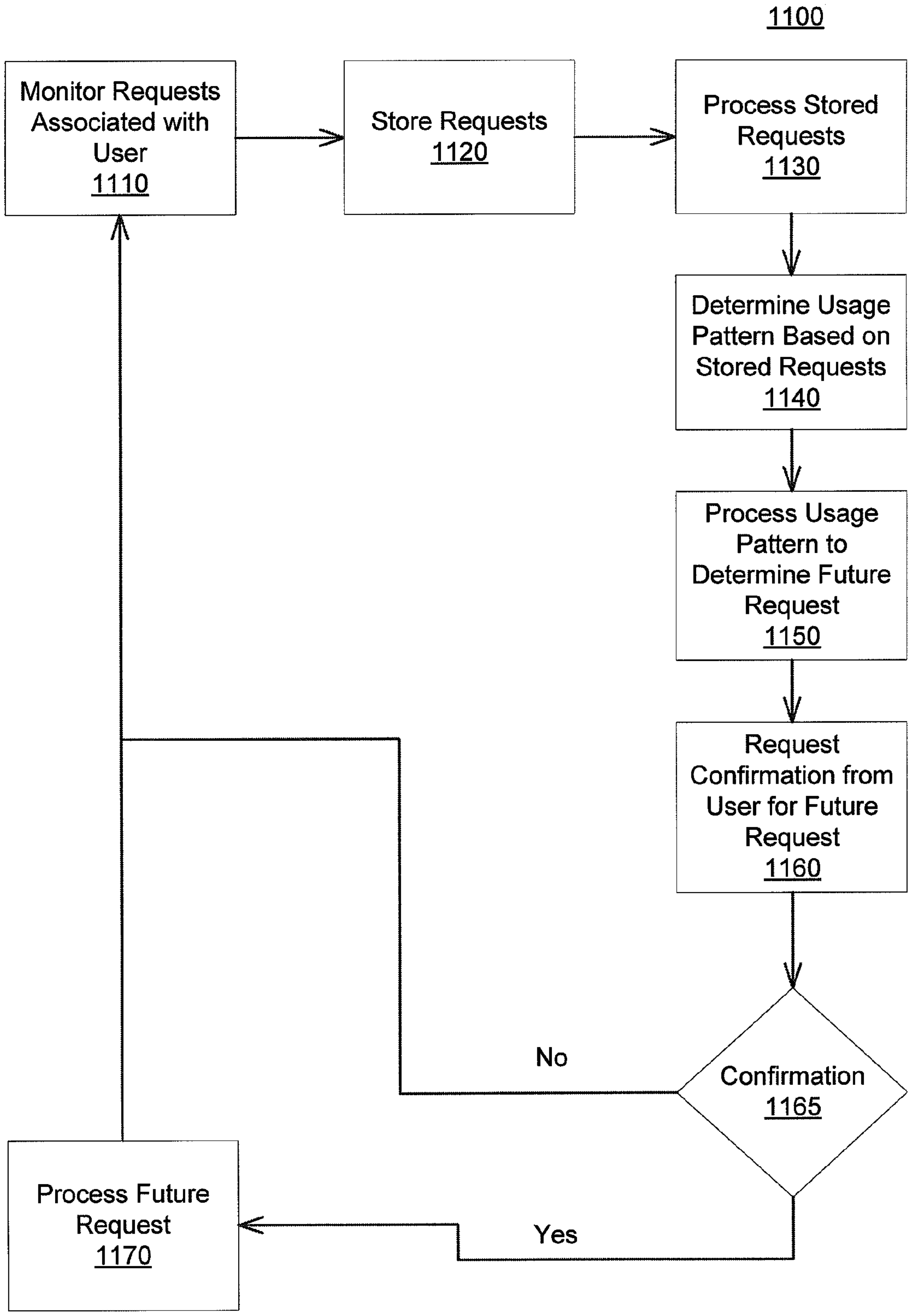
FIG. 11 is a flowchart diagram depicting generation of future requests for a user according to an embodiment of the invention.

FIG. 11 is a flowchart diagram 1100 depicting generation of future requests for a user 110 through the exemplary system 100 of FIG. 1. The interaction repository module 164 monitors (1110) requests associated with the user 110. The requests are stored (1120) in the personal service database 162. The interaction repository module 164 processes (1130) the stored requests and determines (1140) one or more usage patterns based on the stored requests. The personal service server 160 processes (1150) one or more of the usage patterns to determine a future request. The personal service interface 125 communicates with the user 110 through the user's computing device 120 to confirm (1160) whether the user wants to process the future request. If the user 110 confirms (1165) the future request, then the future request is processed (1170) by the personal service server 160 and the interaction repository module 164 monitors (1110) requests associated with the user 110. If the user 110 does not confirm (1165) the future request, then the interaction repository module 164 monitors (1110) requests associated with the user 110.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of a communication network include a local area network (LAN), a wide area network (WAN), the Internet, a wired network, a wireless network, a packet-based network, and/or a circuit-based network.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The system can include clients and servers. A client and a server are generally remote from each other and typically interact through a communication network. The relationship of client and server arises by virtue of computer programs running on the respective computers and having a client-server relationship to each other.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for personal service integration on a telecommunication network, the method comprising:

monitoring, by a personal service server, a plurality of telecommunication service requests associated with a user, wherein the telecommunication service requests are received over a wireless network and the telecommunication service requests are between the user and one or more people;

determining, by the personal service server, a first usage pattern for the user with the personal service server based on the plurality of telecommunication service requests associated with the user;

determining, by the personal service server, one or more telecommunication services from a plurality of telecommunication services based on the first usage pattern to fulfill the first usage pattern;

modifying, by the personal service server, the one or more telecommunication services based on information associated with the first usage pattern to customize the one or more telecommunication services for communication between the user and the one or more people;

receiving, by the personal service server, a new telecommunication service request from the user;

determining, by the personal service server, based on the first usage pattern, that the modified one or more telecommunication services can be used to fulfill the new telecommunication service request; and fulfilling, by the personal service server, the new telecommunication service request, comprising integrating the modified one or more telecommunication services.

2. The method of claim 1 wherein the determining the one or more telecommunication services is further based on the telecommunication service request received from the user.

3. The method of claim 2 wherein the telecommunication service request received from the user is received by a digital personal assistant module.

4. The method of claim 2 further comprising processing the telecommunication service request using speech recognition, handwriting recognition, text processing, or any combination thereof.

5. The method of claim 1 further comprising:

determining a future telecommunication service request associated with the user based on the first usage pattern; and determining whether to process the future telecommunication service request based on a user response.

6. The method of claim 5 further comprising:

querying, by a digital personal assistant module, the user regarding the future telecommunication service request; and receiving the user response associated with the future telecommunication service request.

7. The method of claim 5 wherein the future telecommunication service request is a request for service between the user and the one or more people, and the future telecommunication service request requires using the modified one or more telecommunication services.

8. The method of claim 7 wherein determining the future telecommunication service request comprises:

determining presence information for the one or more people, wherein the presence information includes data indicative of a location and contact information for each of the one or more people; and processing the presence information to determine the future telecommunication service request.

9. The method of claim 7 wherein the future telecommunication service request comprises a dinner reservation for the user and the one or more people.

10. The method of claim 1 further comprising:

selecting a pre-existing template; and modifying the pre-existing template based on the first usage pattern.

11. The method of claim 10 wherein modifying further comprises generating a first template based on the first usage pattern.

12. The method of claim 1 further comprising determining a second usage pattern based on the plurality of telecommunication service requests associated with the user.

13. The method of claim 12 wherein the first usage pattern is associated with a first telecommunication service and the second usage pattern is associated with a second telecommunication service.

14. The method of claim 1 wherein the one or more telecommunications services comprises a message service, a presence status service, a calendar service, a message transmission and receiving service, a conference service, a location identification service, a social attribute identification service, a business communication service, an entertainment service, an information service, an electronic mail service, a phone service, a voicemail service, a television service, a storage service, or any combination thereof.

15. The method of claim 1 further comprising storing the first usage pattern in a storage module.

16. The method of claim 15 further comprising:

selecting a pre-existing template; and modifying the pre-existing template based on the first usage pattern stored in the storage module.

17. The method of claim 1 wherein the first usage pattern comprises data indicative of the user only calling a person from the one or more people at a first location; and fulfilling the new telecommunication service request comprises not checking a location of a person from the one or more people when the user places a call to the person.

18. A computer program product, tangibly embodied in a non-transitory computer readable medium, the computer program product including instructions being configured to cause a data processing apparatus to:

monitor a plurality of telecommunication service requests associated with a user, wherein the telecommunication service requests are received over a wireless network and the telecommunication service requests are between the user and one or more people;

determine a first usage pattern for the user with a personal service server based on the plurality of telecommunication service requests associated with the user;

determine one or more telecommunication services from a plurality of telecommunication services based on the first usage pattern to fulfill the first usage pattern; and modify the one or more telecommunication services based on information associated with the first usage pattern to customize the one or more telecommunication services for communication between the user and the one or more people;

receive a new telecommunication service request from the user;

determine, based on the first usage pattern, that the modified one or more telecommunication services can be used to fulfill the new telecommunication service request; and fulfill the new telecommunication service request, comprising integrating the modified one or more telecommunication services.

19. A system for personal service integration on a telecommunication network, the system comprising, a personal service module configured to:

monitor a plurality of telecommunication service requests associated with a user, wherein the telecommunication service requests are received over a wireless network and the telecommunication service requests are between the user and one or more people; and receive a new telecommunication service request from the user;

a service module configured to modify one or more telecommunication services based on information associated with a first usage pattern to customize the one or more telecommunication services for communication between the user and the one or more people; and a personal service server configured to:

(a) determine the first usage pattern for the user with the personal service server based on the plurality of telecommunication service requests associated with the user, (b) determine the one or more telecommunication services from a plurality of telecommunication services based on the first usage pattern to fulfill the first usage pattern;

(c) determine, based on the first usage pattern, that the modified one or more telecommunication services can be used to fulfill the new telecommunication service request; and (d) fulfill the new telecommunication service request, comprising integrating the modified one or more telecommunication services.

20. The system of claim 19, the personal service server further configured to receive the telecommunication service request from the user and further determine the one or more telecommunication services from the plurality of telecommunication services based on the telecommunication service request from the user.

21. The system of claim 20 further comprising a voice to text module configured to convert the telecommunication service request from the user from a vocal telecommunication service request to a text based telecommunication service request.

22. The system of claim 19, the personal service server further configured to determine a future telecommunication service request associated with the user based on the first usage pattern and determine whether to process the future telecommunication service request based on the user response.

23. The system of claim 19 further comprising a storage module configured to store the first usage pattern, the plurality of telecommunication service requests, or any combination thereof.

24. The system of claim 19 further comprising a virtual personal assistant module configured receive telecommunication service requests from the user, to query the user regarding a future telecommunication service request, or any combination thereof.

25. A system for personal service integration on a telecommunication network, the system comprising:

a means for:

monitoring a plurality of telecommunication service requests associated with a user, wherein the telecommunication service requests are received over a wireless network and the telecommunication service requests are between the user and one or more people; and receiving a new telecommunication service request from the user;

a means for modifying one or more telecommunication services based on information associated with a first usage pattern to customize the one or more telecommunication services for communication between the user and the one or more people; and a means for:

determining the first usage pattern for the user with the personal service server based on the plurality of telecommunication service requests associated with the user and determining the one or more telecommunication services from a plurality of telecommunication services based on the first usage pattern to fulfill the first usage pattern;

determining, based on the first usage pattern, that the modified one or more telecommunication services can be used to fulfill the new telecommunication service request; and fulfilling the new telecommunication service request, comprising integrating the modified one or more telecommunication services.

* * * * *